Aug. 25, 1953  C. E. KERR ET AL  2,649,946
CASE LOADING CHUTE
Filed Feb. 27, 1951  6 Sheets-Sheet 1
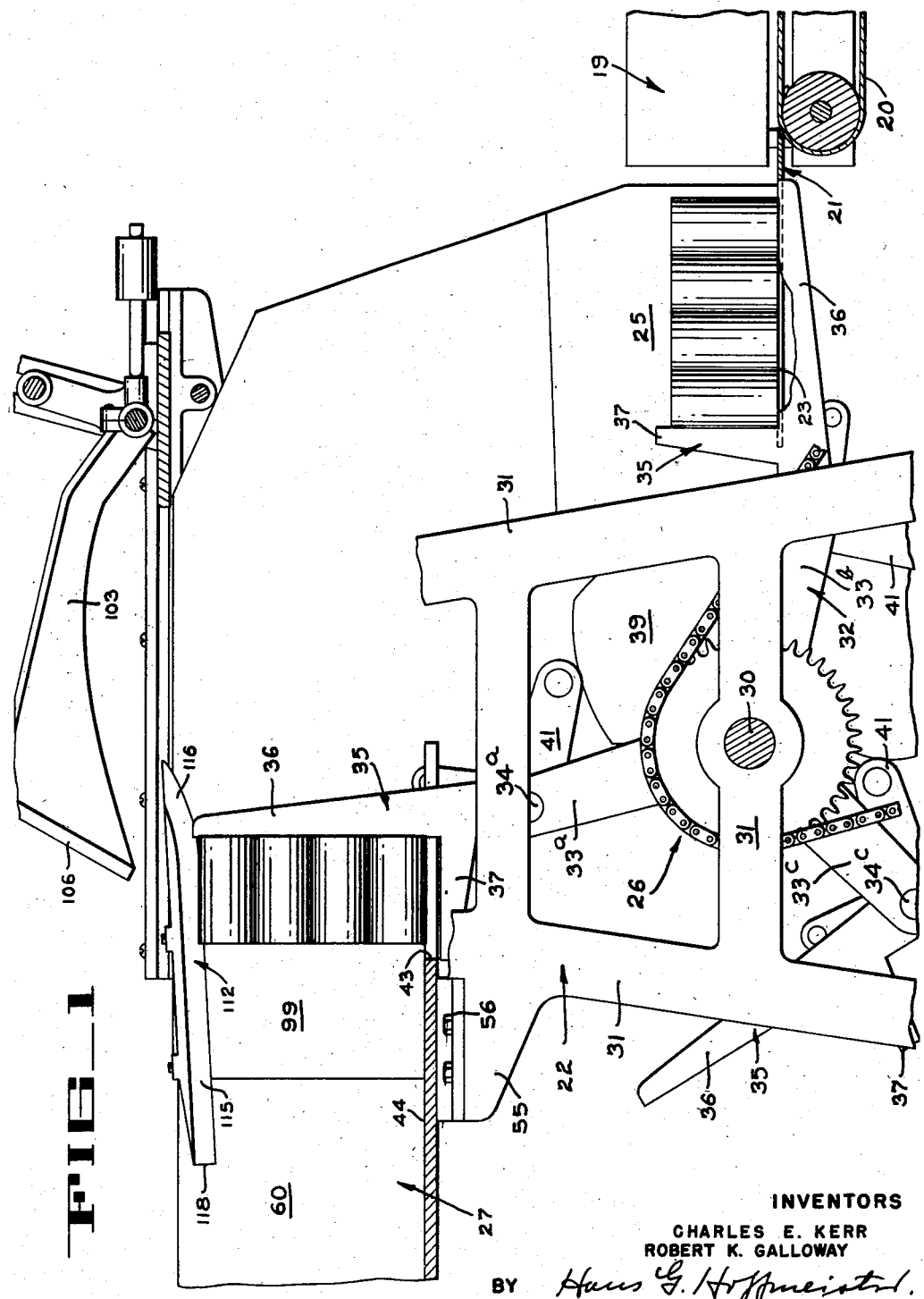
INVENTORS
CHARLES E. KERR
ROBERT K. GALLOWAY
BY Hans G. Hoffmeister
ATTORNEY Aug. 25, 1953
C. E. KERR ET AL
2,649,946
CASE LOADING CHUTE
Filed Feb. 27, 1951
6 Sheets-Sheet 2
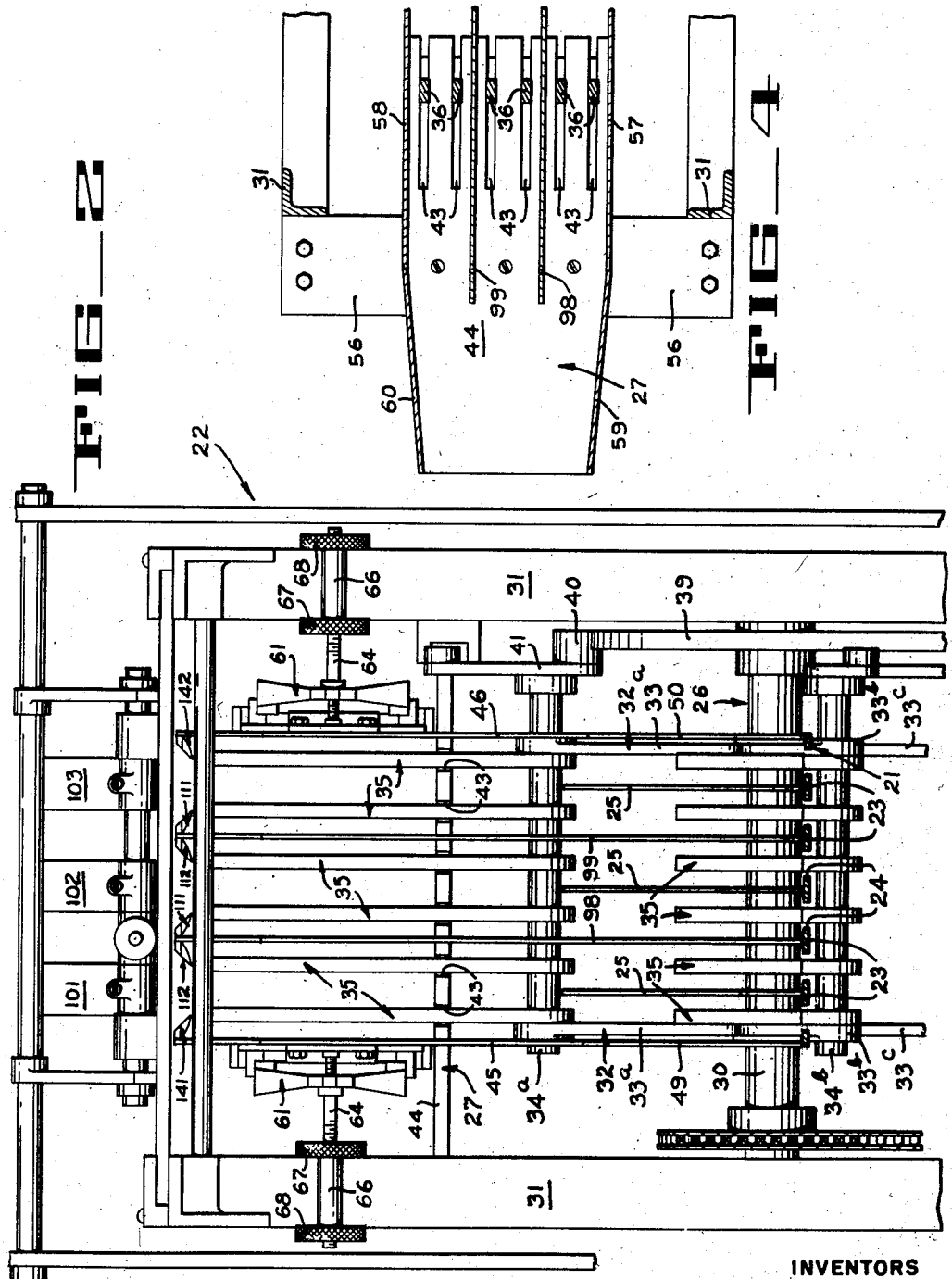
INVENTORS
CHARLES E. KERR
ROBERT K. GALLOWAY
BY *Hans G. Hoffmeister*
ATTORNEY

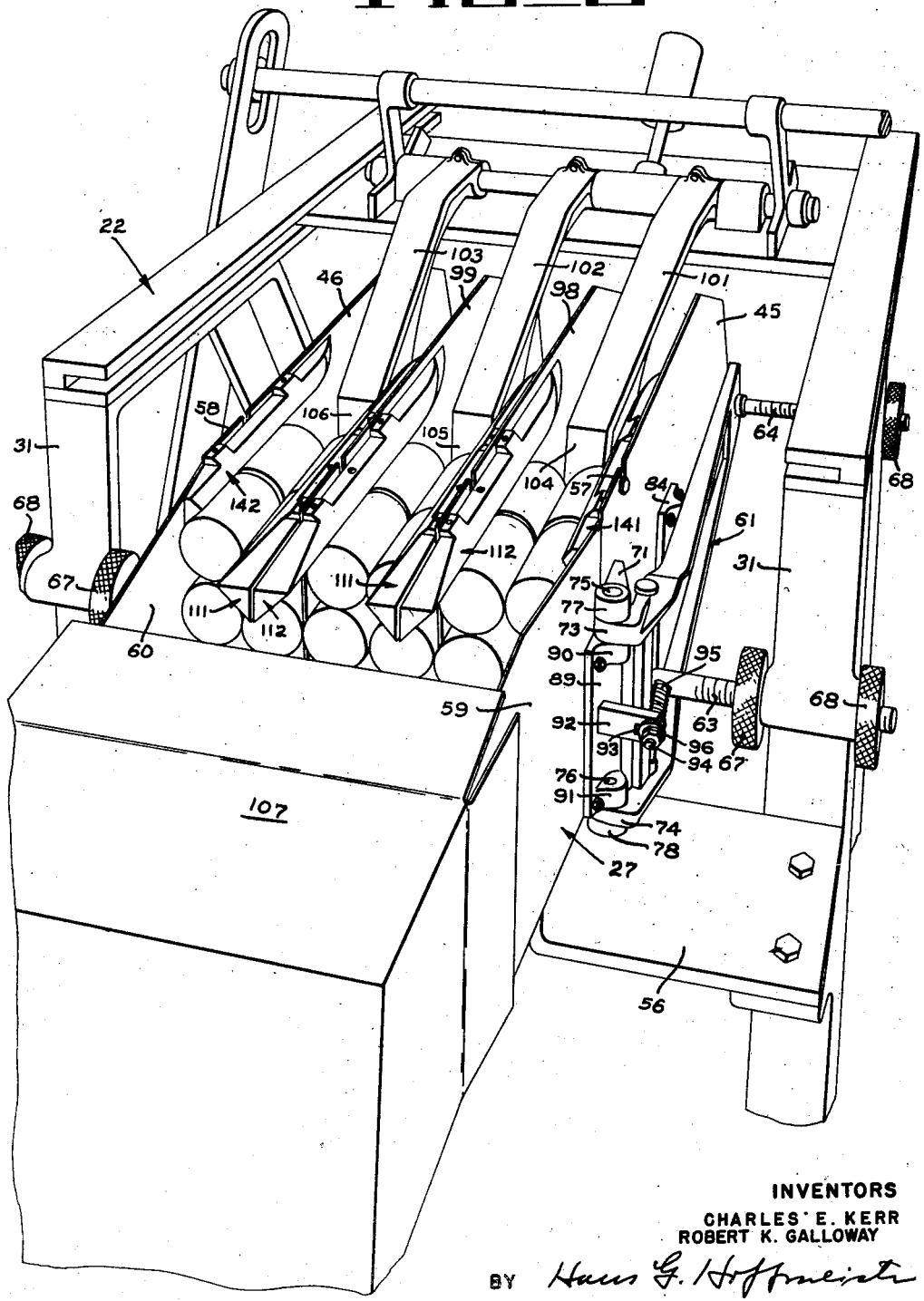

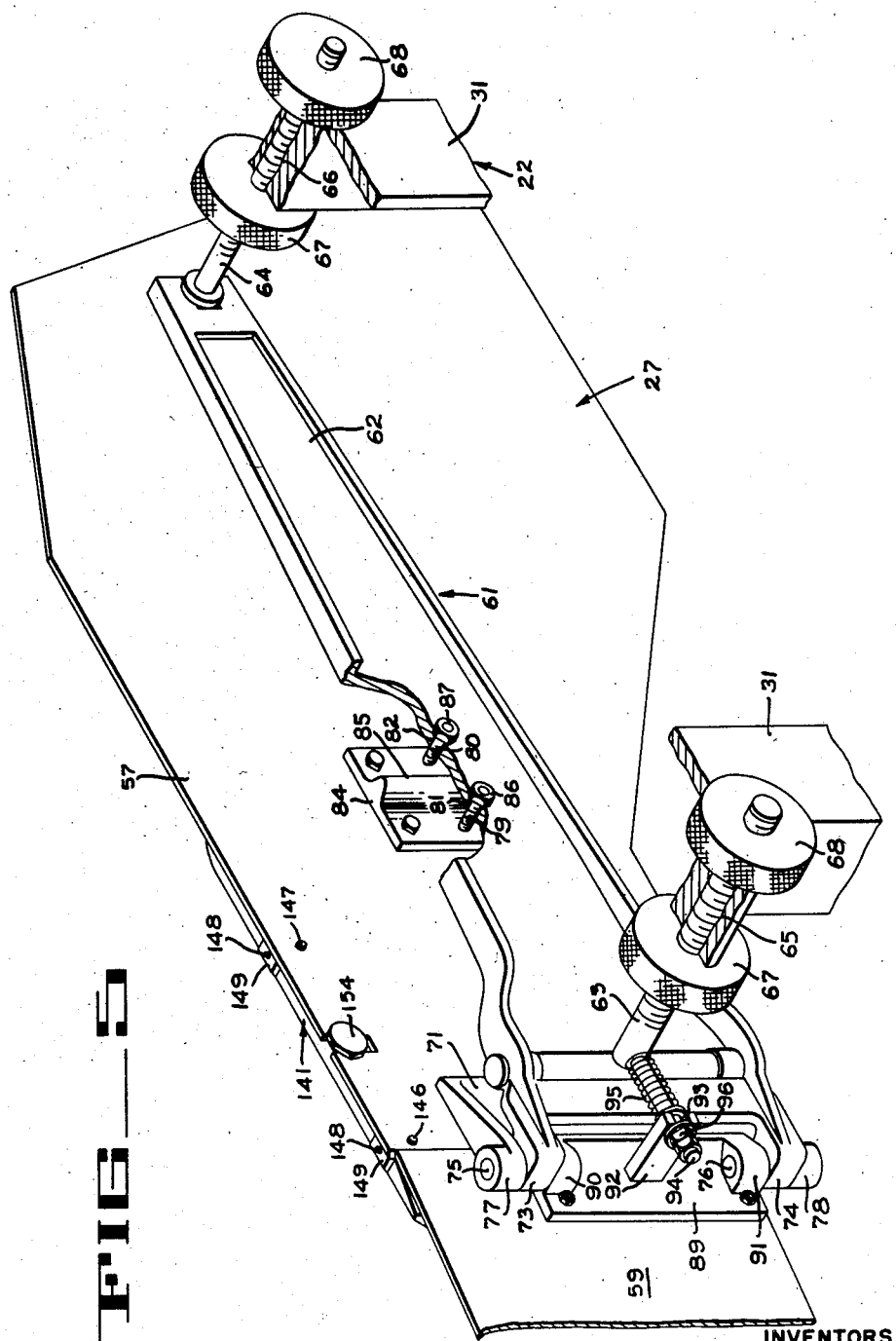

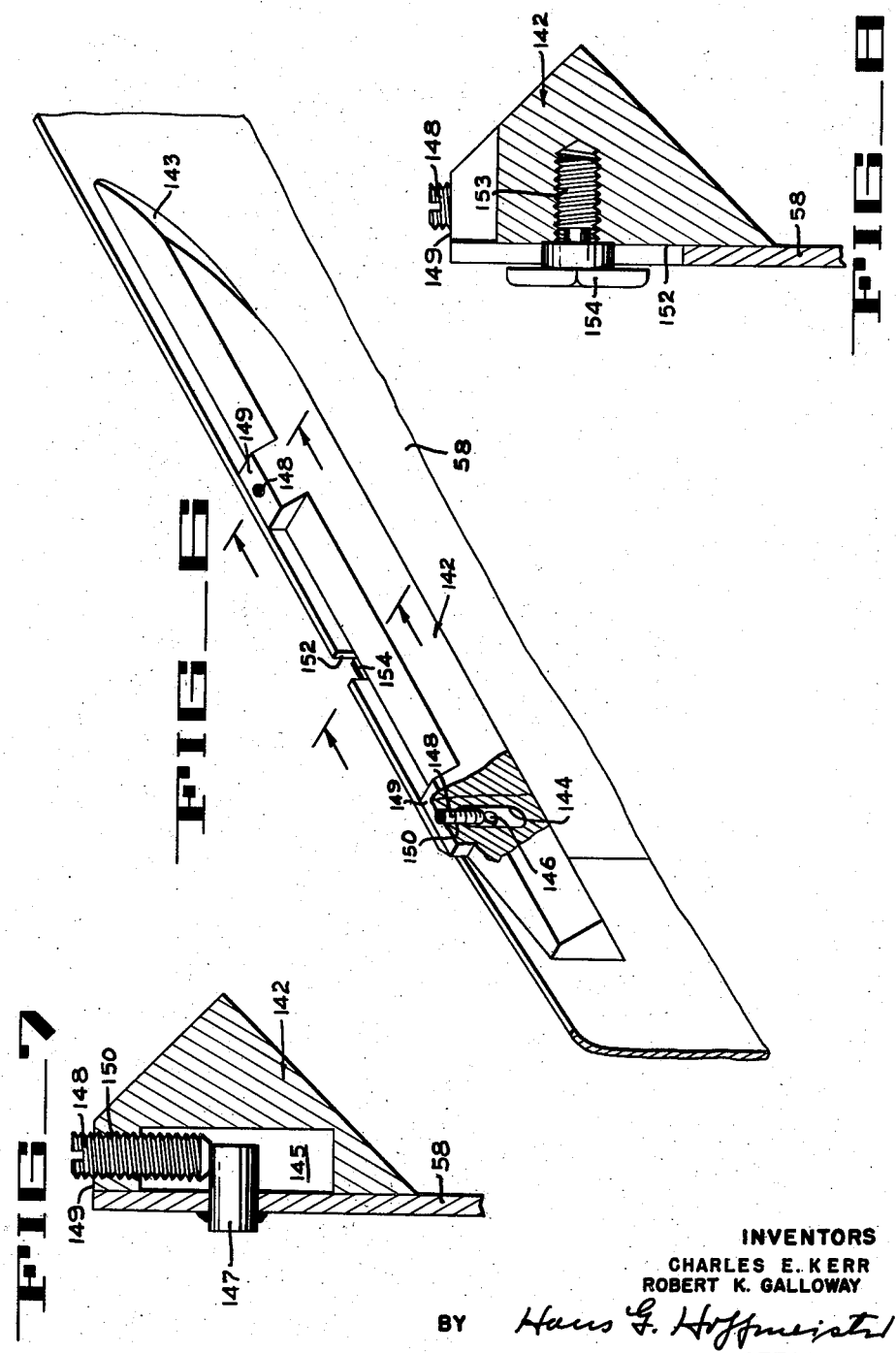

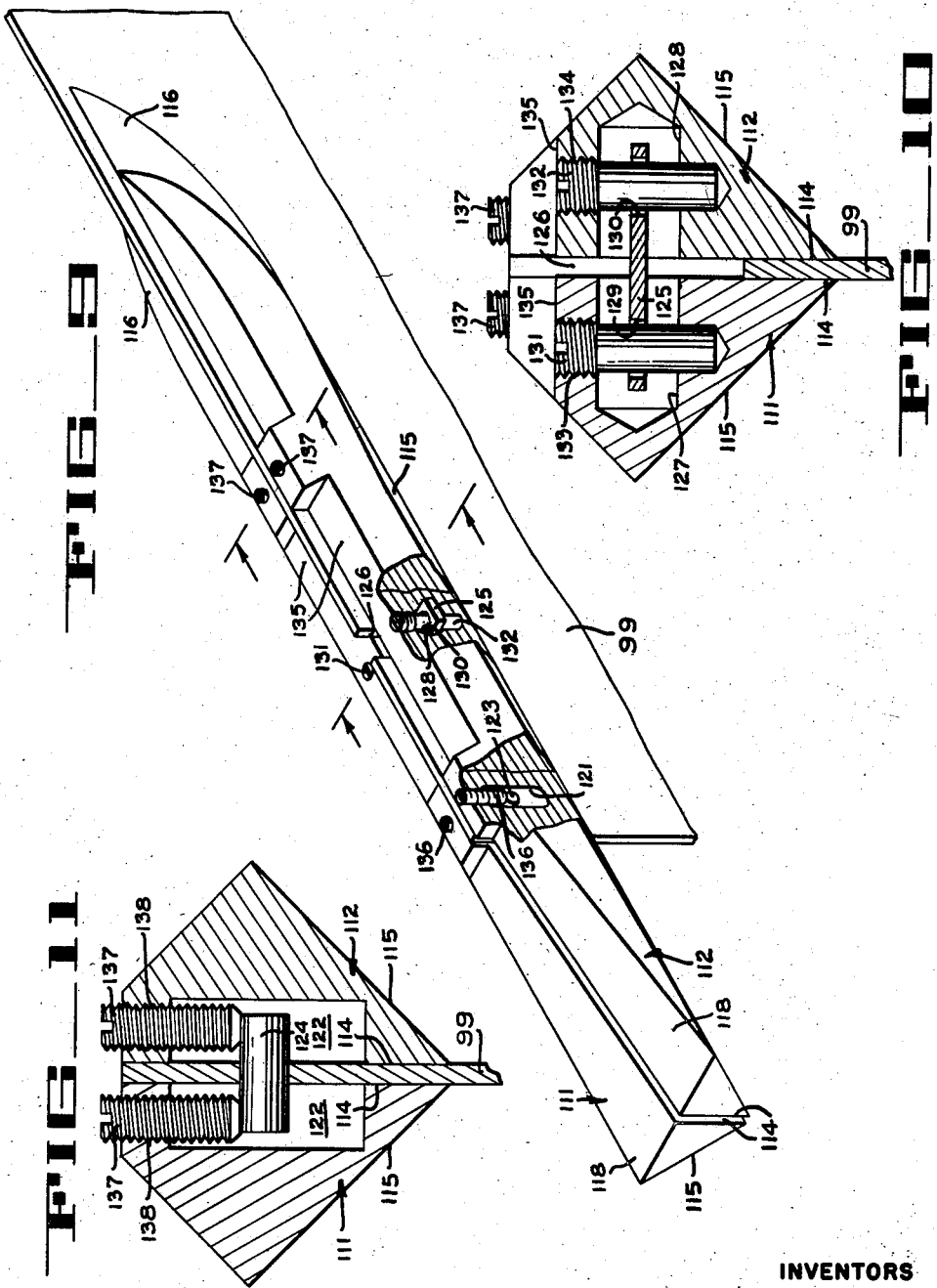

Patented Aug. 25, 1953

2,649,946

UNITED STATES PATENT OFFICE 2,649,946

CASE LOADING CHUTE

Charles E. Kerr and Robert K. Galloway, Hoopeston, Ill., assignors to Food Machinery and Chemical Corporation, San Jose, Calif., a corporation of Delaware Application February 27, 1951, Serial No. 212,936

12 Claims. (Cl. 193—40)

The present invention relates to machines for packing containers, such as cans, into cases, crates or the like. Machines of this type comprise usually mechanism adapted to withdraw tiers of containers from the end of a multi-lane container supply line, to deposit them in lying-down position into a chute which is designed in such a manner that a case or crate may be slipped over its discharge end and which is usually termed the "case-loading chute". The arrangement is usually such that after a predetermined succession of container tiers has been deposited into the chute, case loading means are set into operation which push said container tiers out of the chute against the bottom of the case so that the case with the container tiers inside is detached from the end of the chute and drops upon a conveyor line, trolley or whatever other means may be provided for transporting the filled cases to the next processing station.

To insure smooth and orderly discharge of the tiers of containers from the loading chute into the case or crate slipped over its discharge end, the side walls of the chute are usually hingedly supported and their discharge ends are urged resiliently in inward direction so as to maintain transversely adjacent containers in contact with each other and thus prevent collapse of the container tiers.

The present invention relates particularly to the loading chutes of container casing machines, of the type described, and aims to overcome operational failures of such loading chutes that develop during practical use of container casing machines. Thus, when handling cylindrical cans of relatively light weight, the lateral pressure exerted by the side walls of the chute against the can tiers moving therethrough may occasionally force a can upwardly out the layer formed by transversely adjacent cans so that it becomes seated partially above the uppermost layer of the tier. Such an elevated can cannot be pushed into the shipping case by the case loading means, but is moved against the edge of the case and slides the case off the end of the chute ahead of the can tiers so that the cans drop loosely out of the chute onto the floor or whatever case-conveying means may be provided at the end of the loading chute. Alternatively, in spite of the lateral pressure exerted against the tiers by the side walls of the chute as described hereinbefore, a can in the uppermost layer of the foremost can tier in the chute may occasionally topple forwardly, as the tier is deposited into or pushed through the loading chute, and may fall to the bottom of the chute in front of the foremost can tier; and thereafter, when the can tiers are pushed out of the loading chute, the fallen can or cans come first against the bottom of the case and force the case from the chute before all the can tiers have entered the case. As a result thereof, the case is discharged from the loading chute with less than the intended number of tiers contained therein, while the remaining can tiers drop loosely out of the chute.

It is an object of this invention to provide a loading chute for container casing machines, of the type referred to, that is thoroughly dependable in operation.

Another object is to provide a case loading chute wherein any disorganization of container tiers, while they are deposited thereinto, is dependably prevented.

Still another object is to provide a case-loading chute, of the type referred to, wherein any disorganization of the container tiers, as they are pushed through said chute, is dependably prevented.

A further object is to provide a case-loading chute adapted to receive and guide tiers of containers into a case, wherein it is impossible for individual containers to be squeezed upwardly out of the uppermost layer of the container tier to which they belong.

Furthermore, it is an object to provide a case-loading chute adapted to receive and guide container tiers into a case, wherein it is impossible for containers to fall forwardly out, and in front, of the tier to which they belong.

These and other objects of the present invention will be apparent from the following description of the accompanying drawings which illustrate a preferred embodiment thereof and wherein:

Fig. 1 is a fragmentary side elevation of a container casing machine provided with a case loading chute constructed in accordance with the invention;

Fig. 2 is a fragmentary front elevation of the container casing machine illustrated in Fig. 1.

Fig. 3 is a perspective of the case loading chute forming part of the container casing machine, shown in Fig. 1, viewed from the discharge end thereof.

Fig. 4 is a plan view of the case loading chute shown in Fig. 3.

Fig. 5 is an enlarged fragmentary perspective of the right side wall of said loading chute as viewed from the discharge end thereof;

Fig. 6 is a still further enlarged fragmentary perspective of the other side wall of the loading chute;

Figs. 7 and 8 are cross sectional detail views taken along lines 7—7 and 8—8, respectively, of Fig. 6.

Fig. 9 is a fragmentary perspective, similar to Fig. 6, of one of the partitioning walls provided in the case loading chute of the invention; and Figs. 10 and 11 are cross sectional detail views taken along lines 10—10 and 11—11, respectively, of Fig. 9.

Having first reference to Figs. 1 and 2, a multi-lane container supply line 19 delivers six rows of containers on an endless conveyor belt 20 continuously to the receiving table 21 of the container casing machine 22. Said receiving table is formed by as many container receiving ramps 23 as there are container lines in the supply line. Said ramps have longitudinal center slots 24 and are preferably partitioned from one another by vertical plates 25 that may be supported in any suitable manner from the pedestal of the machine (not shown). From the container receiving table an intermittently operating rotary transfer mechanism 26 lifts the containers assembled thereon onto an elevated case loading chute 27. Said transfer mechanism comprises a transversely disposed main operating shaft 30 that is suitably journaled in side members 31 of the machine frame. Keyed to said shaft at opposite ends thereof are two spiders 32 each composed of three radially extending arms 33a, 33b and 33c which are angularly aligned with one another and the ends of which are bored to freely receive three transverse carrier rods 34a, 34b and 34c, respectively. Pinned to each of said rods are six transfer levers 35, one for each of the six ramps of the container receiving table 21, and as the main shaft 30 turns in counterclockwise direction as viewed in Fig. 1, during operation of the container casing machine, said transfer levers pass from below through the center slots 24 in the container receiving ramps 23. Each of the transfer levers 35 has an elongated container lifting finger 36 and a retaining thumb 37, and during operation of the machine the angular position of the transfer levers is controlled by a stationary cam 39 that is engaged by cam follower rollers 40 pinned to lever arms 41 which are firmly secured to the carrier rods 34a, 34b and 34c. The contour of said control cam is such that the fingers 36 assume a horizontal position, as they move into alignment with and pass through the slots 24 in the ramps 23, and thereafter change gradually to a vertical position so that the containers lifted from the ramps 23 in upright condition assume eventually a lying-down position with their weight bearing against the thumbs 37 of the transfer levers. In this position the transfer levers pass through slots 43 provided in the floor 44 of the case loading chute 27 at the container receiving end thereof (Fig. 4), and thus deposit the cans in superposed lying-down position into said chute; and as the main shaft 30 continues to turn in counterclockwise direction, as viewed in Fig. 1, the transfer levers 35 drop downwardly away from the loading chute pushing the transferred tier of superposed lying-down containers a limited distance ahead within said chute to make room for the next tier of containers that is to be deposited into the chute by the consecutive set of transfer levers 35 comprised in the machine. To dependably maintain the containers in orderly tier formation, as they are transferred from the container receiving table 21 to the loading chute 27 in the described manner, the transfer passage-way may be provided with side walls 45 and 46 which extend from the side walls 49 and 50 of the receiving table to the rear end of the loading chute as shown in Figs. 1 and 2. The container transfer mechanism briefly described above does not form part of the invention proper but exemplifies merely the construction of one type of container casing apparatus in connection with which the loading chute of my invention may be usefully employed. It is more fully described in my co-pending application Serial No. 81,254, filed on March 14, 1949, to which reference is made for details.

Referring now in greater detail to the loading chute, the side members 31 of the machine frame form rearwardly projecting brackets or consoles 55 upon which rests a transverse board or shelf 56 that supports the above mentioned floor 44 of the loading chute (Fig. 1). As previously pointed out, the container receiving end of said floor is provided with longitudinal slots 43 to embrace the circular orbits of the transfer levers 35. The side walls of the loading chute are formed by rearwardly projecting extensions 57 and 58 of the hereinbefore described side walls 45 and 46 of the container transfer passage, and hingedly supported at the rear ends of said extensions are end flaps 59 and 60 that are yieldably urged inwardly to prevent that container tiers pushed rearwardly out of the chute may become disorganized and fall apart in the operation.

To properly position the side walls 57, 58 of the loading chute, each of said side walls is adjustably supported from an exteriorly located bracket 61 which in turn is adjustably supported from the adjacent one of the side members 31 of the machine frame. Having specific reference to Fig. 5 which illustrates the right one of the chute side walls, as viewed from the discharge end of the chute, each of the two brackets 61 is formed by an elongated channel 62 connected at its opposite ends to the ends of two threaded rods 63 and 64 that project loosely through two bores 65 and 66, respectively, in the adjacent side member 31 of the machine frame. Each of said rods carries knurled collars 67 and 68 at either side of the frame member 31. When said collars are loose, the position of the channel 62 transversely of the machine may be adjusted by shifting the rods 63 and 64 within the bores 65 and 66, respectively, whereupon the collars 67 and 68 may be tightened against the frame member 31 to lock the rods 63 and 64 in adjusted position. At its rear end the channel 62 is hingedly connected to a bracket 71 that is rigidly secured to the side wall 57 of the loading chute. For this purpose the channel 62 forms at its rear end two vertically spaced bosses 73 and 74 within which are mounted vertical hinge pins 75 and 76, respectively, upon which are engaged two vertically spaced eyes 77 and 78 that are formed at the rear end of the bracket 71. At a point intermediately of the ends of channel 62 an additional support is provided for the side wall of the loading chute by two screw bolts 79 and 80 that extend through holes 81 and 82 in the channel 62 and have their ends firmly mounted in a bracket 84 which is rigidly secured to the chute wall as formed by the rearward extension 57 of the transfer passage wall 45. Intermediately of said screw bolts 79 and 80 the bracket 84 is provided with an outwardly projecting vertical rib 85 of preferably triangular cross section, as shown in Fig. 5. Said rib 85 may be drawn into contact with the channel 62 by tightening nuts 86 and 87 that are engaged over the outwardly projecting ends of the bolts 79 and 80, respectively; by loosening one of said nuts and tightening the other so as to cause the bracket 84 to rock in one or the other direction relative to the channel 62 on the ridge of its rib 85, any unevenness in the sheet metal from which the side wall of the loading chute is made may be conveniently straightened out.

The end flap 59 of the chute wall 57 may likewise be hingedly supported from the pins 75, 76 in the rear end of the channel 62. For this purpose a bracket 89 may be firmly secured to the adjacent end of the flap 59 and may be arranged to form two vertically spaced eyes 90 and 91 that engage the pins 75 and 76, as shown in Fig. 5. To urge the end flap 59 inwardly for the purpose described hereinbefore, said bracket 89 may be provided with a laterally projecting arm 92 that has a slotted outer end 93 which is loosely engaged by a stud 94 that is secured to and extends rearwardly from the rod 63, which supports the channel 62. Coiled around said stud 94 is a spring 95 that is compressed between the rod 63 and the end of arm 92 and in this manner urges the flap 59 to swing inwardly about the hinge pins 75, 76 to an extent that may be predetermined by the position of an adjustable nut 96 engaged upon the threaded rear end of the stud 94. The above description of the side walls of the loading chute 27 is given with specific reference to the right side wall of the chute as illustrated in Fig. 5. It will be understood, however, that said description applies logically to the left side wall 46 of the chute as well, so that a separate description of the latter side wall is unnecessary.

To keep the individual layers of the container tiers properly aligned as they are transferred by the transfer levers 35 from the container receiving table 21 onto the container receiving end of the loading chute 27, two stationary guide surfaces or partitions 98 and 99 may be provided in the transfer passageway intermediately of the side walls 45 and 46 thereof as shown in Fig. 2. Said partitions are arranged to separate the transfer passageway into three channels each of a transverse width adapted to receive and guide two adjacent containers from the ramps 23 to the loading chute 27. At their lower ends said partitions may be suitably supported from those of the ramp partitions 25 with which they are aligned, and they extend into the container receiving end of the loading chute 27 to points transversely in alignment with the rear ends of the side wall extensions 57 and 58 that form the flanks of the loading chute.

Whenever the previously described container transfer mechanism has delivered a predetermined number of tiers into the partitioned loading chute 27, means may be set into operation which push the accumulated container tiers rearwardly out of said chute. In the particular embodiment of a case loading machine illustrated in the accompanying drawings said means have the form of three parallel loading shoes 101, 102 and 103, respectively, one for each of the double file container channels created in the chute by the rear ends of the partitions 98 and 99. Said loading shoes have rearwardly directed flat pusher surfaces 104, 105 and 106, respectively, and during transfer of the container tiers from the container receiving table onto the loading chute, they are held above the loading chute in an elevated position, wherein they do not interfer with the transfer of the container tiers into the chute. After a predetermined number of containers transfer operations, however, a common actuating mechanism operates to dip the loading shoes in unison from said elevated position downwardly into the chute behind the last container tier deposited thereinto, whereupon said shoes advance through the three channels of the chute and push all of the containers in the chute out of the chute into the case 107 slipped over the end flaps 59 and 60 of the chute, as illustrated in Fig. 3. After the described case loading thrust has been performed, said actuating mechanism raises the loading shoes again above the loading chute and returns them to their initial position in this raised condition so as to permit the container transfer mechanism to deposit a new tier of containers into the loading chute during the return movement of the loading shoes. The loading shoes and the actuating mechanism, therefore, do not form part of the invention proper; they merely exemplify one form of container casing machine in connection with which the loading chute of my invention may be usefully employed; they are more fully described in my above mentioned co-pending patent application Serial No. 81,254 filed on March 14, 1949, to which reference is made for details.

To prevent that containers in the uppermost layer of the container tiers deposited into the chute 27 are forced upwardly out of said layer, or are thrown forwardly out and in front of the foremost tier, retaining bars are arranged above and lengthwise of the path of the stacked containers as defined by the side walls 57, 58 and the partitions 98, 99 of the loading chute. Said bars are preferably disposed at a level slightly below the upper level of the can tiers to be deposited into the chute, and they are mounted in such a manner that they are positively restrained from moving in a direction lengthwise of the loading chute. They are free, however, to yield a limited distance in upward direction and/or tilt to a limited extent about a transverse horizontal axis extending intermediately of the ends of the chute, so that they may readily admit the container tiers into the space underneath irrespective of slight variations in the size of the cans and/or slight irregularities in the formation of the can tiers.

Having reference to Fig. 3, each of the partitions 98 and 99 carries a pair of symmetrically arranged and symmetrically constructed retaining bars 111 and 112 in a manner illustrated in greater detail in Figs. 9, 10 and 11. Each of said bars 111, 112 is of such a cross section as to form a flat vertical surface 114 for contact with the partition 98 or 99 from which it is supported, and present an oblique retaining surface 115 for contact with the upper segments of the containers in the uppermost layer of the tier passing through the channels of the chute. At the front ends of said bars 111 and 112, their surfaces 114 and 115 converge in a manner forming an upwardly curved edge 116 which faces the end of the container transfer passage, as shown in Fig. 1. The rear ends 118 of said bars 111, 112 extend a limited distance beyond the rear ends of the partitions 98, 99 into the container discharge space defined by the yieldable end flaps 59 and 60, as shown in Figs. 1, 3 and 6.

To mount the bars 111 and 112 for movement in the manner defined hereinbefore, each of said bars is provided with a pair of narrow vertical niches 121 and 122 which are engaged over the projecting ends of short transverse studs 123, 124, respectively, that are firmly mounted in each of the partitions 98 and 99, near the upper edges thereof. To hold each pair of bars 111 and 112 in engagement with the ends of said studs 123, 124, said bars are detachably locked together at a point intermediately of said studs by a transverse metal strip 125 that extends through a suitable recess 126 in the upper edge of the particular partitioning wall from which they are supported, and protrudes with its opposite ends into transversely extending holes 127 and 128, respectively, provided in the confronting vertical surfaces 114 of said bars 111 and 112. The ends of said locking strip 125 are perforated, as shown at 129 and 130, respectively (Fig. 10), and said perforations are detachably engaged by vertical screw bolts 131 and 132 that protrude through threaded vertical bores 133 and 134 provided in said bars 111 and 112, and are accessible from the free upper surfaces 135 thereof. Mounted in this manner, the bars 111, 112 are positively prevented from any appreciable movement longitudinally of the chute by engagement of the studs 123 and 124 within the narrow vertical niches 121 and 122, respectively, and also by engagement of the locking strip 125 in the narrow recess 126 of the supporting partition; they may, however, move upwardly or tilt about the locking strip 125 to a limited extent determined by the vertical depth of said niches 121 and 122. To adjust the initial vertical position of the bars 111 and 112 relative to the floor of the loading chute according to the size of the cans to be handled, set screws 136 and 137 are arranged to protrude through threaded bores 138 into the upper ends of said niches from the accessible upper surfaces of said bars as illustrated in Fig. 11. With the studs 123, 124 engaged by the ends of said set screws, instead of by the ceilings of the niches 121 and 122, respectively, the initial position of the bars 111 and 112, vertically of the chute, depends upon the setting of the screws 136 and 137 and may be appropriately varied by manipulation of said screws.

The retaining bars 141 and 142 supported from the side walls 57 and 58 of the chute are similar in construction to the twin bars 111 or 112, respectively. Each of said side bars 141, 142 has an upwardly curved front end 143 and is provided with two longitudinally spaced narrow vertical niches 144 and 145 which are engaged by the inwardly projecting ends of studs 146 and 147, respectively, that are firmly mounted in the side walls of the chute near the upper edges thereof; and the initial vertical position of said side bars 141, 142, relative to the floor of the chute may be controlled by vertical set screws 148 that extend from the accessible upper surface 149 of the side bars through threaded bores 150 into the upper ends of the niches 144 and 145, respectively. To hold the bars 141 and 142 in engagement with the studs 146 and 147, while permitting upwardly yielding or tilting movement of said bars, a recess 152 is provided in the upper edge of each side wall at a point intermediately of the studs 146 and 147. Through said recess 152 the bars 141 and 142, respectively, are engaged by a screw bolt 153 that fits loosely into said recess and which has an enlarged head 154 exteriorly of its respective side wall, as illustrated in Fig. 8.

In operation all the retaining bars 111, 112, 141 and 142 drop freely to the level determined by the set screws 136, 137 and 148, respectively. As a set of containers transfer levers 35 enters the slots 43 in the floor 44 of the loading chute 27 at the entrance end thereof, and delivers a tier of containers separated into containers pairs by the partitions 98, 99, into the loading chute, the cans contact first the arcuate front ends 116 and 143 of the retaining bars and tilt the bars slightly about the fulcrum formed by the locking strips 125 and the screw bolts 153, respectively. The resistance of the retaining bars to this tilting movement pushes the upper layer of the cans in the tier firmly against the fingers 36 of the transfer levers 35 and at the same time presses said containers downwardly against the lower containers in the tier. In this manner all containers in the upper layer of the tiers are properly aligned before they enter the loading chute. As the containers slide further under the smoothly curved ends of the retaining bars and enter the chute, said bars are gradually straightened out and lifted off the transverse studs 123, 124 and 146, 147. They rest now upon the containers themselves, and their weight should, therefore, be so chosen that they are adapted to hold the stacked containers firmly yet without undue pressure in proper alignment with one another, so that none of the containers in the uppermost layer will be squeezed above the level of the remaining containers in said layer. In addition, the frictional resistance of the longitudinally immovable bars to the forward movement of the containers acts as a brake that prevents forward toppling of any of the containers in the uppermost layer of the container tiers as said tiers are placed suddenly into, or pushed through, the loading chute; yet due to the manner in which the bars are mounted which permits them to adjust themselves individually and yield upwardly over their total length, as well as tilt about a transverse axis, the bars are adapted to conform readily to any natural unevenness in the top surface of the tiers such as may be caused by slight variations in can sizes. Thus, they maintain a substantially uniform pressure over the total stack of containers in the chute instead of resting solely upon one of the tiers which might leave the containers in the foremost tier free to shift and change their position.

While we have explained our invention with the aid of a particular embodiment thereof, it will be understood that we do not wish to be limited to the specific constructional details illustrated and described, which may be departed from without departing from the scope and spirit of the invention.

We claim:

1. A chute for delivering tiers of containers into a case, crate and the like, comprising a floor; a pair of side walls disposed at either side of said floor to form a passage-way adapted to contain and pass a multi-layer tier of containers in lying-down condition; a plurality of longitudinal bars, one for each of the individual containers comprised in one transverse row of the tier; and means supporting said bars a distance above said floor in a manner permitting individual upward movement thereof while preventing movement of said bars lengthwise of said passage-way.

2. A chute for delivering tiers of containers into a case, crate and the like, comprising a floor, a pair of side walls disposed at either side of said floor to form a passage-way adapted to contain and pass a multi-layer tier of containers in lying-down condition, a plurality of longitudinal bars, and means supporting said bars a distance above said floor somewhat less than the total height of the container tier in a manner permitting limited upward movement thereof while preventing movement lengthwise of said passage-way.

3. A chute for delivering tiers of containers into a case, crate and the like, comprising a floor; a pair of side walls disposed at either side of said floor to form a passage-way adapted to contain and pass a multi-layer tier of containers in lying-down condition; a plurality of longitudinal bars, one for each of the individual containers comprised in one transverse row of the tier; and means supporting each of said bars a distance above said floor somewhat less than the total height of the total container tier in a manner permitting limited individual upward movement and tilting thereof about a horizontal axis while preventing movement of said bars lengthwise of said passage-way.

4. A chute for delivering tiers of containers into a case, crate and the like, comprising a floor, a pair of side walls disposed at either side of said floor to form a passage-way adapted to receive and pass a multi-layer tier of containers in lying-down condition, a plurality of longitudinal bars one for each of the individual containers comprised in one transverse row of the tier, said bars having upwardly curved ends at the receiving end of said passage-way, and means supporting said bars a distance above said floor somewhat less than the total height of the container tier in a manner permitting limited upward movement and tilting thereof while preventing movement lengthwise of said passage-way.

5. A chute for delivering tiers of containers into a case, crate and the like comprising a substantially horizontal floor, a pair of side walls disposed at either side of said floor to form a passage-way, a number of partitions disposed parallel to and intermediately of said side walls to divide said passage-way into a number of separate channels, bars extending longitudinally of and disposed in vertical alignment with said channels, and means supporting said bars at a distance above said floor in a manner permitting limited individual upward movement while preventing longitudinal movement thereof.

6. A loading chute for delivering multi-layer tiers of containers in lying-down condition into a case, crate and the like comprising a substantially horizontal floor; a pair of side walls disposed at either side of said floor to form a passage-way having a container-receiving end; a number of partitions disposed parallel and intermediately of said side walls to divide said passage-way into a number of separate channels of a transverse width adapted to contain at the most two adjacently positioned containers; a number of bars for each of said channels, said bars extending longitudinally of said channels and having upwardly rounded ends at the container receiving end of said passage-way; and means supporting said bars in vertical alignment with said channels a distance above said floor slightly less than the total height of the container tier in a manner permitting limited individual upward movement and tilting thereof about an axis extending transversely of said passage-way, while preventing lengthwise movement of said bars.

7. A chute for delivering multi-layer tiers of containers into a case, crate and the like comprising a floor; a pair of side walls disposed at either side of said floor to form a passage-way having a container receiving end and a container discharge end; a number of partitions disposed intermediately of said side walls to divide said passageway into a number of separate channels of a transverse width holding at the most two adjacent containers; bars extending longitudinally of said channels and disposed along the inner surfaces of said side walls and at either side of said partitions, said bars having upwardly rounded ends at the receiving end of said passage-way; means supporting said bars from said side walls and said partitions, respectively, a distance above said floor slightly less than the total height of the container tiers in a manner permitting limited upward movement and tilting thereof about an axis extending transversely of said passage-way, while preventing longitudinal movement thereof; side flaps hingedly supported adjacent to said side walls at the discharge end of said passage-way, and means resiliently urging said side flaps toward each other.

8. A case loading chute comprising a horizontal floor; a pair of side walls disposed at either side of said floor to form a passage-way adapted to receive and pass a multi-layer tier of containers in lying-down condition; longitudinal bars disposed adjacent to the inner surfaces of said side walls near the upper edges thereof, said bars having a pair of niches of predominantly vertical compass provided in the surfaces adjacent to said side walls at longitudinally spaced points; means for supporting said bars from said side walls at points intermediately of said niches in a manner leaving them free to move upwardly and tilt about a transverse axis; and inwardly projecting pins mounted in said side walls and engaging the niches in the adjacent ones of said bars so as to limit tilting motion and upward movement of said bars according to the vertical depth of said niches.

9. A case loading chute comprising a substantially horizontal floor, a pair of side walls disposed at either side of said floor to form a passage-way adapted to receive and pass a multi-layer tier of containers in lying-down condition, said side walls having vertical recesses provided in their upper edges at mid-points thereof; a longitudinal bar disposed adjacent to the inner surface of each of said side walls near the upper edge thereof, said bars having upwardly rounded edges at the container receiving end of said passage-way and a pair of niches of predominantly vertical compass, formed adjacent to their respective side walls at either side of the said recesses thereof; laterally projecting bolts mounted in said bars at points intermediately of said niches and protruding through said recesses to support the bars in a manner leaving them free to tilt about the axis of said bolts and to be lifted upwardly with said bolts guided within said recesses; inwardly projecting pins mounted in said side walls at either side of said recesses and engaging the said niches in adjacent ones of said bars so as to limit tilting motion and upward movement of said bars according to the vertical depth of said niches; and means including set screws protruding into the upper ends of said nitches for adjusting the initial vertical position of said bars.

10. A case loading chute comprising a floor, a pair of side walls arranged at either side of said floor to form a passage-way adapted to receive and pass a multi-layer tier of containers in lying-down condition, a number of partitions disposed intermediately of said side walls to subdivide said passage-way into a number of separate channels, a number of longitudinal bars, one for each of said channels disposed along said side walls and said partitions, respectively, said bars having pairs of niches provided in their flanks at either side of mid-points thereof; means supporting said bars at said mid-points from said side walls and said partitions, respectively, in a manner leaving said bars free to tilt about a transverse axis passing through said mid-points, and to be lifted in vertical direction; and transverse pins firmly mounted in said side walls and partitions, respectively, and engaging the niches in adjacent one of said bars so as to limit tilting motion and upward movement of said bars according to the vertical depth of said niches.

11. A case loading chute comprising a substantially horizontal floor; a pair of vertical side walls arranged at either side of said floor to form a passage-way adapted to receive and pass a multi-layer tier of containers in lying-down condition; a number of vertical partitions disposed intermediately of and parallel to said side walls to subdivide said passage-way into a number of separate channels, each of said side walls and partitions having recesses provided in their upper edges at mid-points thereof; a number of longitudinal bars, one for each of said channels; disposed along said side walls and said partitions, respectively, said bars having upwardly rounded ends at the receiving end of said passage-way and a pair of niches provided in their flanks at either side of said mid-points; means mounted in said bars and engaging the said recesses in the upper edges of adjacent ones of said side walls and partitions, respectively, to support said bars in a manner leaving them free to tilt about a transverse axis passing through said recesses and to be lifted upwardly along a path determined by the confines of said recesses; transverse pins firmly mounted in said side walls and partitions, respectively, at either side of said recesses and engaging the said niches in adjacent ones of said bars so as to limit tilting motion and upward movement of said bars according to the vertical depth of said niches; and means for adjusting the vertical depth of said niches.

12. A case loading chute according to the claim 11 wherein said last mentioned means comprise vertical set screws extending from the top surfaces of said bars into the upper ends of said niches.

CHARLES E. KERR.
ROBERT K. GALLOWAY.

References Cited in the file of this patent

UNITED STATES PATENTS

| Number | Name | Date |
| --- | --- | --- |
| 924,351 | Hitchcock | June 8, 1909 |
| 1,348,549 | Dewey | Aug. 3, 1920 |
| 2,115,647 | Ross | Apr. 26, 1938 |
| 2,127,924 | Kimball et al. | Aug. 23, 1933 |
| 2,500,699 | Nakaura | Mar. 14, 1950 |